United States Patent Office 3,342,790
Patented Sept. 19, 1967

3,342,790
POLYVINYL THIOETHERS
Louis de Vries, Richmond, Calif., assignor to Chevron Research Company, a corporation of Delaware
No Drawing. Filed Feb. 3, 1965, Ser. No. 430,186
12 Claims. (Cl. 260—79.5)

ABSTRACT OF THE DISCLOSURE

Polyvinyl thioethers having aryl groups substituted on sulfur, wherein the polymers are of from 10,000 to 1,000,000 molecular weight. The subject polymers are prepared by displacement of chlorine in polyvinyl chloride with aryl mercaptides in a polar solvent at elevated temperatures.

---

This invention concerns novel polyvinyl thioethers and their method of preparation. More particularly, this invention concerns novel polyvinyl aryl thioethers and their method of preparation.

Vinyl thioethers are only difficultly polymerized and then to only relatively low molecular weight polymers. See C. E. Schildknecht, Vinyl and Related Polymers, pp. 635–638, John Wiley and Sons, Inc., New York (1952). The presence of the sulfur, rather than enhancing the polymerizability of the vinyl group, tends to inhibit polymerization to high molecular weight polymers of the vinyl thioethers.

It has now been found that polyvinyl aryl thioethers can be obtained by displacing the chlorine of polyvinyl chloride in the presence of a polar solvent (heteroatoms containing, e.g., oxygen) with an alkali metal salt of an aryl mercaptide at elevated temperatures.

The polyvinyl chloride which is used may be a homo- or copolymer having as much as 5 mole percent of a different monomer which does not interfere with the substitution of the chlorine. The alternative monomer will be referred to as "inert" monomer. Preferably, the polyvinyl chloride polymer will be a homopolymer, >95 mol percent vinyl chloride.

The polyinvyl chloride will generally be of at least 10,000 molecular weight, and the upper limit of molecular weight is a limitation solely of convenience and availability of the polyvinyl chloride. Generally, the upper limit for the molecular weight of polyvinyl chloride will be about $1 \times 10^6$ or higher.

Various monomers which may be present as comonomers with the vinyl chloride include vinyl acetate, vinyl cyanide, ethyl methacrylate, etc.

The aryl mercaptides are substituted and unsubstituted hydrocarbon thiols of from 6 to 10 carbon atoms, i.e., thiophenol and thionaphthol. Various substituents include halo, i.e., fluoro, chloro, bromo and iodo, nitro, carboxy and derivatives thereof, e.g., esters and amides, oxocarbonyl substituents, e.g., keto, etc. The preferred substituents are the amino and substituted amino groups, particularly mono- and dialkylamino, where the alkyl groups are from 1 to 10 carbon atoms. Generally, the unsubstituted and substituted aryl mercaptides will vary from about 6 to 26 carbon atoms, more usually about 6 to 18 carbon atoms, although the number of carbon atoms is one of convenience and not a limitation based on the operability of the invention.

Illustrative of the various thiols which find use in this invention are thiocresol, α-, β-thionaphthol, thiophenol, o-, m-, p-chlorothiophenol, o-, m-, p-fluorothiophenol, o-, m-, p-nitrothiophenol, o-, m-, p-carbethoxythiophenol, o-, m-, p-cyanothiophenol, o-, m-, p-aminothiophenol, o-, m-, p-methylaminothiophenol, o-, m-, p-ethylaminothiophenol, isopropylaminothiophenol, hexylaminothiophenol, di(n-propyl)aminothiophenol, dibutylaminothiophenol, o-, m-, p-dimethylaminothiophenol, o-, m-, p-diethylaminothiophenol, o-, m-, p-decylaminothiophenol, etc.

The thiophenols are used in the form of alkali metal mercaptides, e.g., lithium, sodium, and potassium, particularly as the sodium mercaptide.

The solvents which are used are polar and capable of dissolving both the mercaptide and the polyvinyl chloride. Single or mixed solvents may be used as convenient. Solvents of particular interest are the polyethers derived from ethylene and propylene oxide. Illustrative of such solvents are the diethyl ether of ethylene glycol, the diethyl ether of propylene glycol, the diethyl ether of diethylene glycol, the dimethyl ether of diethylene glycol, the dimethyl ether of ethylene glycol, the dipropyl ether of ethylene glycol, etc. The ethereal (polyether) solvents will generally have from 2 to 4 oxygens and from 4 to 16 carbon atoms. Other solvents which find use are dimethyl formamide, dimethyl sulfoxide, hexamethylphosphoramide, N-methyl pyrrolidone, etc. The solvents which find use generally have one or more heteroatoms, e.g., oxygen or nitrogen, are nonhydroxylic and inert to the reactants. The solvents may be used individually or in combination.

The concentration of a polyvinyl chloride in the solvent will generally be at least about 0.1 weight percent to a convenient viscosity. Usually, the concentration of polyvinyl chloride will be in the range of about 1 to 30 weight percent. The concentration of the polyvinyl chloride is not critical, but one of convenience. The mole ratio of the mercaptide to the polyvinyl chloride based on chlorine present in the polymer will generally be at least 1:1 (one mercaptide per chlorine in the polymer) and usually from about 2 to 10, preferably from about 2 to 5 moles of mercaptide per atom of chlorine present.

The temperature for the reaction will generally be at least 50° C. and rarely exceed 185° C. Most usually, the temperature will be in the range of about 90° to 150° C. The temperature will be determined in part by the choice of solvent and of mercaptide. The time for reaction will generally be at least 1 hour, and more usually in the range of about 1 to 24 hours.

The polyvinyl thioethers have a group of the following formula as the repeating unit:

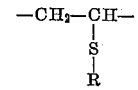

wherein R is a carbocyclic aryl of from 6 to 26 carbon atoms and substituted carbocyclic aryl of from 6 to 26 carbon atoms. The mercaptides previously disclosed are illustrative of the R groups and are incorporated in the definition of R by reference.

Preferably, the repeating unit has the following formula:

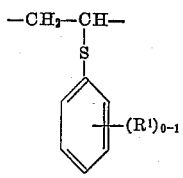

wherein $R^1$ is alkyl of from 1 to 10 carbon atoms, amino, monoalkylamino of from 1 to 10 carbon atoms, dialkylamino of from 2 to 20 carbon atoms, carbalkoxy (—CO$_2$ alkyl) of from 2 to 11 carbon atoms, nitro, cyano, and halo of atomic number 9 to 53. The amino substituent on the thiophenyl group will generally have from 0 to 10 carbon atoms and will usually be amino, lower alkylamino or di(lower alkyl)amino.

The following examples are offered by way of illustration and not by way of limitation.

EXAMPLE 1

Into a flask was introduced polyvinyl chloride (approximate mol. wt.=$2\times10^5$) into hot diethylene glycol dimethyl ether. To the solution was then added a large excess of the sodium salt of benzene thiol and the mixture allowed to stand on a steam plate overnight. The product was then precipitated with methanol, redissolved in benzene and reprecipitated with methanol for a total of three reprecipitations.

*Analysis.*—C=71.6%, H=6.3%, S=22.1%, Cl=<0.2%

EXAMPLE 2

Into a reaction vessel was charged 5 g. of polyvinyl chloride (approximate mol. wt.=$2\times10^5$) in 150 ml. of the dimethyl ether of diethylene glycol and the solution heated to 100° C., all of the polyvinyl chloride dissolving. To this solution was added a solution of the sodium salt of para-aminobenzene thiol prepared by reacting 20.4 g. of para-aminobenzene thiol plus 8 g. of 50% sodium hydride in 75 ml. of N-methyl pyrrolidone and the mixture heated at 110° C. for 16 hours. The product was then precipitated with methanol and was found to be soluble in a benzene acetone mixture.

*Analysis.*—C=64%, H=6.6%, S=18.8%, N=8.4%, Cl=<0.5%.

The above examples demonstrate the complete displacement of chlorine by the mercaptides. The products therefore are polymers of vinyl aryl thioethers, the thioether appearing on alternating carbons.

The polymers of this invention find a variety of uses which are common to polymeric materials. They can be used in film forming, molding, in mixtures with other polymers with which they are compatible, etc.

The presence of substituents on the aryl group, such as amino or carboxy, further increases the applications of these polymeric materials. The amino substituents are able to chelate with metal cations, such as copper, nickel and iron cations, to provide polymeric substances in which the metal cations are tightly bound. The presence of the metal cations provides many interesting and novel properties to the product, e.g., electrical conductance. The amino substituted polymers may also be used to extract cations which can be chelated from complex mixtures of cations.

As will be evident to those skilled in the art, various modifications on this process can be made or followed, in the light of the foregoing disclosure and discussion, without departing from the spirit or scope of the disclosure or from the scope of the following claims.

What is claimed is:

1. A method for preparing polyvinyl aryl thioethers which comprises treating a solution of polyvinyl chloride in a polar solvent at elevated temperatures with an alkali metal salt of an aryl mercaptan.

2. A method according to claim 1 wherein said solvent is ethereal.

3. A method according to claim 2 wherein said ethereal solvent is a polyether of from 4 to 16 carbon atoms and from 2 to 4 oxygens.

4. A method according to claim 1 wherein said elevated temperature is in the range of about 50° to 185° C. and said solvent is ethereal.

5. A method according to claim 4 wherein said mercaptan is phenyl mercaptan.

6. A method according to claim 4 wherein said mercaptan is para-aminophenylmercaptan.

7. Polyvinyl thioethers of from about 10,000 to 1,000,000 molecular weight having as their repeating unit, a unit of the following formula:

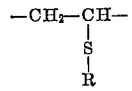

where R is selected from the group consisting of carbocyclic aryl of from 6 to 10 carbon atoms and substituted carbocyclic aryl of from 6 to 26 carbon atoms.

8. A polyvinyl thioether according to claim 7 wherein R is phenyl.

9. A polyvinyl thioether according to claim 7 wherein R is aminophenyl.

10. A polyvinyl thioether according to claim 7 wherein R is lower alkylaminophenyl.

11. A polyvinyl thioether according to claim 7 wherein R is di(lower alkyl)aminophenyl.

12. A polyvinyl thioether according to claim 7 wherein R is para-aminophenyl.

No references cited.

JOSEPH L. SCHOFER, *Primary Examiner.*

D. K. DENENBERG, *Assistant Examiner.*